United States Patent [19]
Jensen

[11] Patent Number: 6,105,595
[45] Date of Patent: Aug. 22, 2000

[54] METHOD, SYSTEM, AND APPARATUS FOR AUTOMATICALLY PREVENTING OR ALLOWING FLOW OF A FLUID

[75] Inventor: Sam C. Jensen, Glendora, Calif.

[73] Assignee: Cooper Technologies Co., Houston, Tex.

[21] Appl. No.: 08/813,841

[22] Filed: Mar. 7, 1997

[51] Int. Cl.$^7$ .......................... B23B 47/18; B23B 27/10; B23B 51/06

[52] U.S. Cl. .............................. 137/15; 137/318; 173/19; 173/154; 251/249.5; 251/264; 408/1 R; 408/56; 408/138

[58] Field of Search ..................... 137/318, 15; 251/248, 251/249.5, 264, 80, 81; 408/130, 1 R, 56, 57, 138, 141; 173/19, 154

[56] References Cited

U.S. PATENT DOCUMENTS

| | | | |
|---|---|---|---|
| Re. 26,623 | 7/1969 | Erikson | 408/56 |
| Re. 33,711 | 10/1991 | Ono et al. | 81/464 |
| 942,163 | 12/1909 | Berner . | |
| 2,233,163 | 2/1941 | Fosnot | 121/35 |
| 2,257,893 | 10/1941 | Van Sittert et al. | 121/34 |
| 2,261,204 | 11/1941 | Amtsberg | 121/34 |
| 2,285,638 | 6/1942 | Amtsberg | 192/30.5 |
| 2,339,530 | 1/1944 | Van Sittert et al. | 192/30.5 |
| 2,373,664 | 4/1945 | Emery | 192/30.5 |
| 2,399,251 | 4/1946 | Porter | 192/30.5 |
| 2,491,635 | 12/1949 | Allen, Jr. | 408/56 |
| 2,543,979 | 3/1951 | Maurer | 192/150 |
| 2,580,631 | 1/1952 | Whitledge | 192/30.5 |
| 2,727,598 | 12/1955 | Mitchell et al. | 192/0.034 |

(List continued on next page.)

FOREIGN PATENT DOCUMENTS

| | | |
|---|---|---|
| 0079319A1 | 10/1982 | European Pat. Off. . |
| 0665087A1 | 1/1995 | European Pat. Off. . |
| 0676262A1 | 3/1995 | European Pat. Off. . |
| 0759340A1 | 8/1995 | European Pat. Off. . |
| 0719618A1 | 1/1996 | European Pat. Off. . |
| 0721823A1 | 1/1996 | European Pat. Off. . |
| 739689A1 | 10/1996 | European Pat. Off. . |
| WO96/11090 | 10/1995 | WIPO . |

OTHER PUBLICATIONS

Catalog—Deschner Kinecheks "Speed Regulators for Moving Devices" © 1988.
Catalog—Industrial Tool Division, INDRESCO, "Operating Instructions and Service Manual Quackenbush," © 1995.
Catalog—Intool Incorporated, "Operating Instructions and Service Manual Cleco," © 1996.
Operating Instructions and Service Manual Quackenbush® 230QGDA–RAC–SU–MS, pp. 1–20 (1997).
"Operating Instructioins and Service Manual Cleco® No. 40NLTVC & 40RNLTVC Series Solenoid Controlled Right Angle Nutrunners", pp. 1–23 (1997).
"Operating Instructions and Service Manual Cleco® 35TNAL & 35TNL Tubenut Nutrunners" pp. 1–15 (1998).
"Operating Instructions and Service Manual Quackenbush® 15QDA–RAB–SU–RS Positive Feed Drill" pp. 1–23 (1997).
"How Quackenbush Postive Feed Drills Operate" 1 page (undated).

Primary Examiner—George L. Walton
Attorney, Agent, or Firm—Coats & Bennett, P.L.L.C.

[57] ABSTRACT

An automatic fluid valve (25) includes a drive member (32) having an aperture (43) and a driven member (54). The automatic fluid valve (25) also includes at least one torque transfer member (38) for transferring torque from the drive member (37) to the driven member (54) and at least one elastic member (36) disposed between the drive member (32) and the driven member (54). The at least one elastic member (36) is responsive to a force transferred by the driven member (54). The automatic fluid valve (25) also includes a fluid blocking member (30) disposed within the aperture (43) for selectively allowing or preventing the flow of fluid (100) through the aperture (43). The fluid blocking member (30) is responsive to compression or decompression of the at least one elastic member (36).

19 Claims, 3 Drawing Sheets

U.S. PATENT DOCUMENTS

| | | | |
|---|---|---|---|
| 2,768,546 | 10/1956 | Amtsberg | 81/52.3 |
| 2,784,819 | 3/1957 | Reynolds | 192/30.5 |
| 2,893,276 | 7/1959 | Quackenbush | 77/34.4 |
| 2,973,068 | 2/1961 | Sturrock | 192/0.096 |
| 2,974,553 | 3/1961 | Donowick | 81/52.3 |
| 2,980,218 | 4/1961 | Young | 192/30.5 |
| 3,027,152 | 3/1962 | Deschner | 267/1 |
| 3,030,839 | 4/1962 | Schadlich | 81/52.3 |
| 3,088,445 | 5/1963 | Gardner | 123/41 |
| 3,093,360 | 6/1963 | Krouse | 253/2 |
| 3,170,523 | 2/1965 | Short | 173/104 |
| 3,174,559 | 3/1965 | Vaughn | 173/12 |
| 3,191,404 | 6/1965 | Schivley, Jr. | 64/26 |
| 3,199,314 | 8/1965 | Schrader | 64/26 |
| 3,244,013 | 4/1966 | Deschner | 74/18.2 |
| 3,298,481 | 1/1967 | Schaedler et al. | 192/0.034 |
| 3,411,385 | 11/1968 | Quackenbush | 77/32.8 |
| 3,411,593 | 11/1968 | Quackenbush | 173/145 |
| 3,429,206 | 2/1969 | Quackenbush | 77/34.7 |
| 3,512,433 | 5/1970 | Juhasz et al. | 408/138 |
| 3,512,434 | 5/1970 | Juhasz et al. | 408/138 |
| 3,515,225 | 6/1970 | States | 173/12 |
| 3,515,251 | 6/1970 | Clapp | 192/150 |
| 3,574,290 | 4/1971 | Eckman | 408/9 |
| 3,592,274 | 7/1971 | Young | 173/93.6 |
| 3,608,131 | 9/1971 | Hornschuch et al. | 173/12 |
| 3,616,864 | 11/1971 | Sorensen | 173/12 |
| 3,667,345 | 6/1972 | Schaedler et al. | 91/59 |
| 3,703,933 | 11/1972 | Schoeps | 173/12 |
| 3,710,873 | 1/1973 | Allen | 173/12 |
| 3,741,313 | 6/1973 | States | 173/12 |
| 3,797,583 | 3/1974 | Quackenbush | 173/4 |
| 3,833,068 | 9/1974 | Hall | 173/169 |
| 3,951,217 | 4/1976 | Wallace et al. | 173/169 |
| 3,960,035 | 6/1976 | Workman et al. | 74/785 |
| 3,989,113 | 11/1976 | Spring, Sr. et al. | 173/163 |
| 3,989,405 | 11/1976 | Quackenbush | 408/11 |
| 4,019,589 | 4/1977 | Wallace | 173/12 |
| 4,109,735 | 8/1978 | Bent | 173/163 |
| 4,223,745 | 9/1980 | Workman, Jr. | 173/12 |
| 4,243,109 | 1/1981 | Anderson | 173/93.5 |
| 4,257,499 | 3/1981 | Deschner | 188/287 |
| 4,286,902 | 9/1981 | Gagliano et al. | 408/79 |
| 4,291,771 | 9/1981 | Perraud | 173/106 |
| 4,307,784 | 12/1981 | Smith | 173/12 |
| 4,320,806 | 3/1982 | Koltermann et al. | 173/12 |
| 4,359,107 | 11/1982 | Smith | 173/12 |
| 4,379,492 | 4/1983 | Hiraoka | 173/12 |
| 4,396,318 | 8/1983 | Jensen et al. | 408/95 |
| 4,418,764 | 12/1983 | Mizobe | 173/12 |
| 4,467,877 | 8/1984 | Koltermann et al. | 173/12 |
| 4,480,699 | 11/1984 | Elmer | 173/12 |
| 4,546,833 | 10/1985 | Berecz et al. | 173/12 |
| 4,557,643 | 12/1985 | Cioci | 408/56 |
| 4,586,884 | 5/1986 | Berger et al. | 418/43 |
| 4,591,299 | 5/1986 | Eckman | 408/1 R |
| 4,592,681 | 6/1986 | Pennison et al. | 408/10 |
| 4,631,992 | 12/1986 | Eckman | 81/470 |
| 4,642,005 | 2/1987 | Kondo et al. | 408/56 |
| 4,681,490 | 7/1987 | Pennison et al. | 408/10 |
| 4,683,961 | 8/1987 | Schoeps | 173/93 |
| 4,693,322 | 9/1987 | Gartside | 173/116 |
| 4,718,500 | 1/1988 | Mori | 173/132 |
| 4,740,144 | 4/1988 | Biek | 418/266 |
| 4,767,151 | 8/1988 | Agostini | 296/97 K |
| 4,767,379 | 8/1988 | Schoeps | 464/25 |
| 4,772,186 | 9/1988 | Pyles et al. | 418/43 |
| 4,799,833 | 1/1989 | Pennison et al. | 408/132 |
| 4,813,822 | 3/1989 | Biek | 408/138 |
| 4,822,215 | 4/1989 | Alexander | 408/138 |
| 4,822,264 | 4/1989 | Kettner | 418/150 |
| 4,844,177 | 7/1989 | Robinson et al. | 173/12 |
| 4,854,916 | 8/1989 | Schoeps et al. | 464/25 |
| 4,880,064 | 11/1989 | Willoughby et al. | 173/12 |
| 4,884,995 | 12/1989 | Schoeps | 464/25 |
| 4,919,022 | 4/1990 | Ono et al. | 81/464 |
| 4,921,376 | 5/1990 | Tani et al. | 408/57 |
| 5,076,311 | 12/1991 | Marschke | 137/318 |
| 5,080,181 | 1/1992 | Tatsuno | 173/93.5 |
| 5,082,066 | 1/1992 | Schoeps | 173/12 |
| 5,083,619 | 1/1992 | Giardino et al. | 173/93 |
| 5,092,410 | 3/1992 | Wallace et al. | 173/93.5 |
| 5,094,303 | 3/1992 | Jenne | 173/91 |
| 5,147,245 | 9/1992 | Schoeps | 464/25 |
| 5,149,232 | 9/1992 | Eckman | 408/138 |
| 5,163,519 | 11/1992 | Mead et al. | 173/91 |
| 5,172,771 | 12/1992 | Wilson | 173/1 |
| 5,181,545 | 1/1993 | Koshikawa et al. | 140/92.1 |
| 5,228,523 | 7/1993 | Rahm | 173/219 |
| 5,327,636 | 7/1994 | Wilson | 29/525 |
| 5,346,022 | 9/1994 | Krivec | 173/178 |
| 5,346,023 | 9/1994 | Takagi et al. | 173/178 |
| 5,377,769 | 1/1995 | Hasuo et al. | 173/169 |
| 5,395,187 | 3/1995 | Slesinski et al. | 408/56 |
| 5,429,553 | 7/1995 | Schoeps | 464/25 |
| 5,492,185 | 2/1996 | Schoeps et al. | 173/177 |
| 5,544,710 | 8/1996 | Groshans et al. | 173/176 |
| 5,558,168 | 9/1996 | Rahm | 173/178 |
| 5,567,886 | 10/1996 | Kettner | 73/862.23 |
| 5,690,137 | 11/1997 | Yamada | 408/57 |
| 5,755,537 | 5/1998 | Lubbering | 408/56 |

METHOD, SYSTEM, AND APPARATUS FOR AUTOMATICALLY PREVENTING OR ALLOWING FLOW OF A FLUID

TECHNICAL FIELD OF THE INVENTION

The present invention relates generally to drills and cutters and more particularly to a method, system, and apparatus for automatically preventing or allowing flow of lubricant or coolant to a cutter of a drill.

BACKGROUND OF THE INVENTION

Positive feed drills are well known for drilling holes through hard substrates such as steel and titanium. Positive feed drills generally include a spindle that, in addition to rotating, also advances toward the substrate being drilled. Conventional applications for positive feed drill include, for example, aircraft fuel tanks. When using positive feed drills, coolant or lubricant is ordinarily delivered by a mist lubricator to reduce the heat generated through the friction of drilling and also to provide lubrication. Conventional mist lubricators may be manually started or may automatically start when the positive feed drill is turned on. Conventionally, coolant or lubricant is delivered from a reservoir through a hose where it enters a union attached to a hollow rotating spindle of the positive feed drill. The coolant or lubricant mist travels through the spindle until it reaches a cutter associated with the positive feed drill. This procedure allows cooling or lubrication at the interface of the cutter with the material being drilled.

Conventionally, when the cutter breaks through the substrate that is being drilled, a user must either manually terminate the lubrication mist or, in conventional automatic systems, completely shut off the drill. These conventional techniques create several problems. For example, when the cutter breaks through the substrate, coolant or lubricant may spray through the substrate into the area behind the substrate being drilled. In some cases, the coolant or lubricant may spray into an aircraft fuselage or fuel tank, which are typical applications for positive feed drills. This problem is exacerbated in applications in which several layers of material having air gaps between the layers are drilled. Such applications are common in aircraft manufacturing. The spraying of coolant or lubricant into these areas causes contamination because, for example, many of the types of fluids used as coolants or lubricants do not mix well with adhesives used to seal fuel tanks. Furthermore, spraying of coolant or lubricant into aircraft fuel tanks could lead to contamination of the aircraft fuel. Therefore, conventionally, after use of such a tool, the inside of the device being drilled must be cleaned, which increases the expense associated with the drilling procedure. Other applications in which it is undesirable for coolant or a lubricant to feed into the drilled area also suffer similar disadvantages.

In the past, efforts to address these problems have focused on employee training, encouraging operators of positive feed drills to either turn off the positive feed drills or manually terminate coolant or lubricant flow immediately upon penetration of the cutter into a drilled region. However, accurately identifying the point at which the cutter breaks through a drilled substrate is often difficult and often requires expensive equipment; and therefore, the results achieved through such attempts to address the above-described problems associated with providing lubricant to a cutter are somewhat lacking.

SUMMARY OF THE INVENTION

In accordance with the present invention, a method, system, and apparatus for automatically preventing or allowing flow of a fluid are provided that address disadvantages and problems associated with previous techniques. According to an aspect of the present invention an automatic fluid valve includes a drive member having an aperture and also includes a driven member. The automatic fluid valve includes at least one torque transfer member for transferring torque between the drive member to the driven member and at least one elastic member disposed between the drive member and the driven member. The at least one elastic member is responsive to a force transferred by the driven member. The automatic fluid valve also includes a fluid blocking member disposed within the aperture for selectively allowing or preventing the flow of fluid through the aperture. The fluid blocking member is responsive to compression or decompression of the at least one elastic member.

According to another aspect of the present invention a method for automatically preventing or allowing fluid to flow to a cutting device includes providing a drive member and a driven member. The combination of the drive member and the driven member creates a portion of a fluid seal. The method also includes providing a supply of fluid to the drive member, and disposing an elastic member between the drive member and the driven member. The method further includes rotating the drive member and the driven member, providing a thrust force to the driven member, and compressing the elastic member through transfer of a portion of the thrust force to the elastic member. The method further includes displacing the drive member relative to the driven member through compression of the elastic member, and opening the fluid seal through relative motion of the drive member and the driven member.

The invention provides several technical advantages. For example the invention automatically senses penetration of a cutter through a substrate and automatically prevents flow of lubricant to the cutter. Automatic prevention of lubricant flow is advantageous for many reasons. For example, such prevention of lubricant flow eliminates costly clean up procedures associated with inadvertent provision of lubricant within a cavity, such as an airplane fuel tank. Furthermore the invention eliminates the need for an operator to observe and tend to external coolant delivery. Moreover, the use of expensive equipment to sense penetration of a drilled surface by a cutter may be avoided. Although the use of the invention provides advantages for many applications, it is particularly advantageous in applications in which multiple substrates separated by air gaps are being drilled because undesired lubricant flow that conventionally is difficult to prevent in such applications may be prevented.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE INVENTION

The preferred embodiments of the present invention and its advantages are best understood by referring to FIGS. 1–5 of the drawings, like numerals being used for like and corresponding parts of the various drawings.

Figure 1:
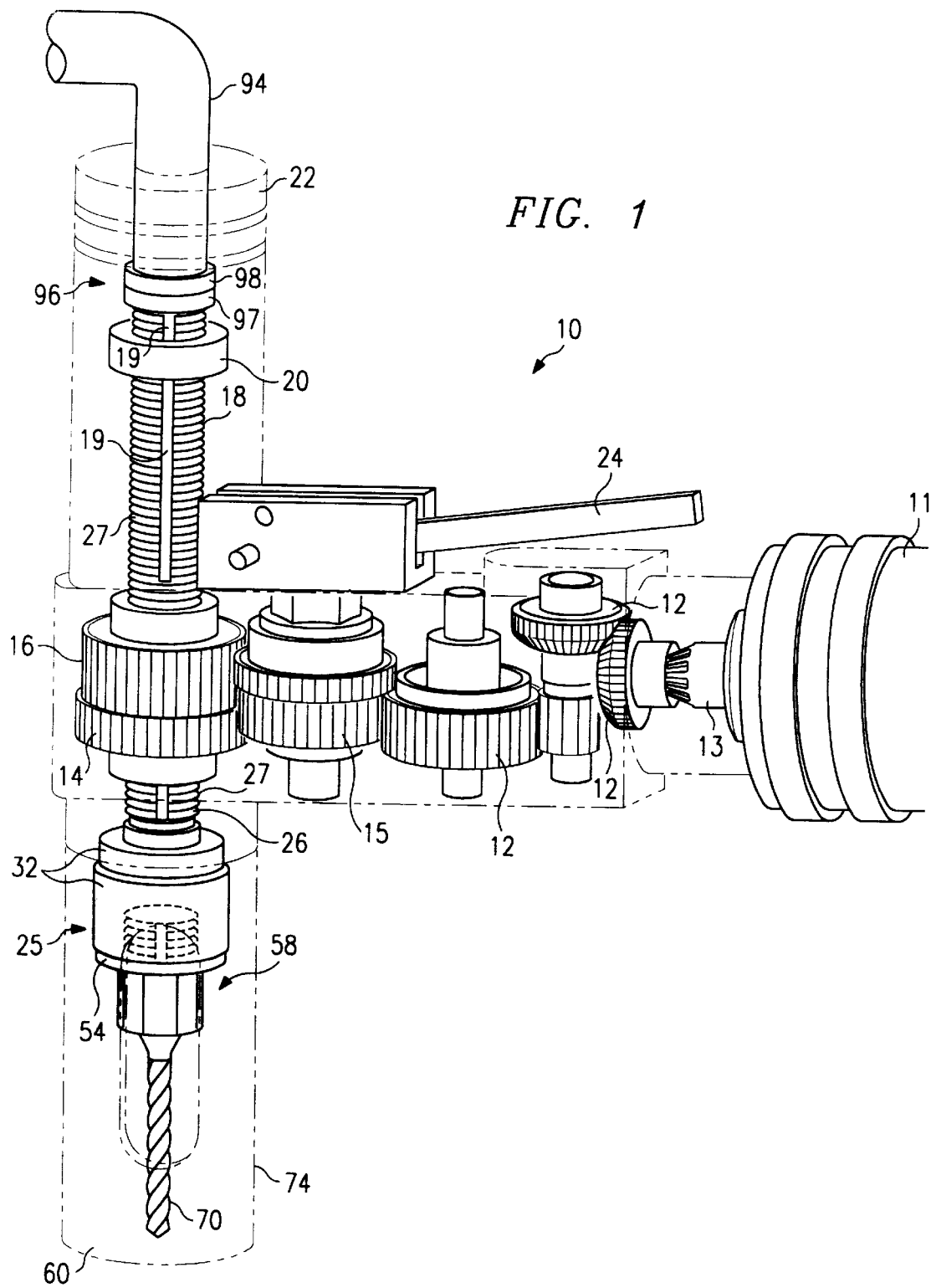
FIG. 1 is a sectional drawing showing a side view with portions broken away of a positive feed drill coupled to a cutter through an automatic shut-off valve in accordance with the teachings of the present invention.

FIG. 1 is a drawing showing a side view with portions broken away of a positive feed drill 10 coupled to a cutter 58 through an automatic shut-off valve 25 in accordance with the teachings of the present invention. Automatic shut-off valve 25 automatically allows or prevents flow of lubricant or coolant from positive feed drill 10 to cutter 58.

Positive feed drills, such as positive feed drill 10, generally include a spindle that, in addition to rotating, also advances toward the substrate being drilled. Conventional applications for positive feed drills include, among numerous other applications, drilling through aircraft fuel tanks. Although positive feed drill 10 is shown, any suitable positive feed drill that is operable to advance a cutter may be used according to the teachings of the present invention.

In the embodiment illustrated in FIG. 1, positive feed drill 10 includes an air motor 11. Air motor 11 may be powered by a pressurized air source (not explicitly shown). Air motor 11 rotates drill spindle 13. The rotation of drill spindle 13 is transferred to spindle drive gear 14 and spindle feed gear 16 through a plurality of rotation gears 12 and through differential feed gear 15. A function of the spindle feed gear 16 is to advance or retract spindle 18. Spindle 18 includes external threads 27 running the length of the spindle 18. External threads 27 illustrated in FIG. 1 are left-handed threads; however, right-handed threads may be used. Spindle 18 also includes four drive grooves 19 running the length of the spindle 18. Although four drives grooves 19 are shown, other suitable numbers of drive grooves 19 may be used.

Spindle drive gear 14 includes internal male splines (not explicitly shown) that engage drive grooves 19 on spindle 18. When air motor 11 is actuated, spindle drive gear 14 rotates, turning spindle 18. Spindle feed gear 16 is threaded internally (not explicitly shown) to match the external threads 27 of spindle 18. When spindle feed gear 16 rotates faster than spindle 18, spindle 18 will feed, causing downward motion of spindle 18. When spindle feed gear 16 rotates slower than spindle 18, spindle 18 will retract upwards. The desired feed rate is obtained by the differential gear ratio between drill spindle 13 and spindle feed gear 16. For safety, a spindle guard 22 surrounds spindle 18.

Positive feed drill 10 also includes a feed stop collar 20 and a feed engagement lever 24. At the completion of a drilling cycle, feed stop collar 20 contacts feed engagement lever 24. This contact lifts differential feed gear 15 and locks it, and therefore spindle feed gear 16, in a stationary position. With spindle 18 continuing to rotate in a forward direction and spindle feed gear 16 held stationary, spindle 18 automatically retracts.

In this embodiment, spindle 18 is hollow and includes internal threads (not explicitly shown) for coupling with automatic shut-off valve 25. Drive end 26 of spindle 18 is coupled to drive member 32 of automatic shut-off valve 25 through external threads 28 on drive member 32 (external threads 28 are shown best in FIG. 2). Automatic shut-off valve 25 includes a driven member 54 for coupling with cutter 58. Driven member 54 includes internal threads 44 (shown best in FIG. 2), which mate with external threads 56 on cutter 58.

Cutter 58 illustrated in FIG. 1 is one example of a cutter that may be used with a positive feed drill. Cutter 58 includes cutting portion 70 for penetrating the surface of a substrate to be drilled. For safety purposes, a tool nose 74 surrounds cutter 58.

According to the teachings of the present invention, automatic shut-off valve 25 automatically senses contact of cutting portion 70 with a drilled substrate and penetration of cutting portion 70 through the drilled substrate. Upon sensing contact of cutting portion 70 with a drilled substrate, automatic shut-off valve 25 allows lubricant or coolant to flow through spindle 18 to cutting portion 70 of cutter 58 to lubricate or cool the interface of cutting portion 70 with a drilled substrate. Upon sensing penetration of cutting portion 70 through the drilled substrate, automatic shut-off valve 25 automatically terminates flow of lubricant or coolant to cutter 58. Therefore, lubricant or coolant is only emitted through automatic shut-off valve 25 during actual drilling.

Lubricant or coolant is received by spindle 18 through hose 94, which is connected to a fluid or coolant reservoir (not explicitly shown). Hose 94 attaches to spindle 18 through collar 96. Collar 96 includes a rotating portion 97 that rotates with spindle 18 and a stationary portion 98 that remains stationary with hose 94, allowing spindle 18 to rotate as the drilling process is taking place, but allowing hose 94 to remain stationary. Coolant or lubricant is therefore allowed to flow through the interior of spindle 18 to automatic shut-off valve 25. As described above, automatic shut-off valve 25 controls whether lubricant or coolant is allowed to flow to cutter 58. Because lubricant or coolant is only emitted during actual drilling, expense associated with cleaning excess coolant inside drilled containers, such as aircraft fuel tanks, is eliminated. Furthermore, automatic shut-off valve 25 eliminates the need for an operator to observe and control external coolant delivery.

Figure 2:
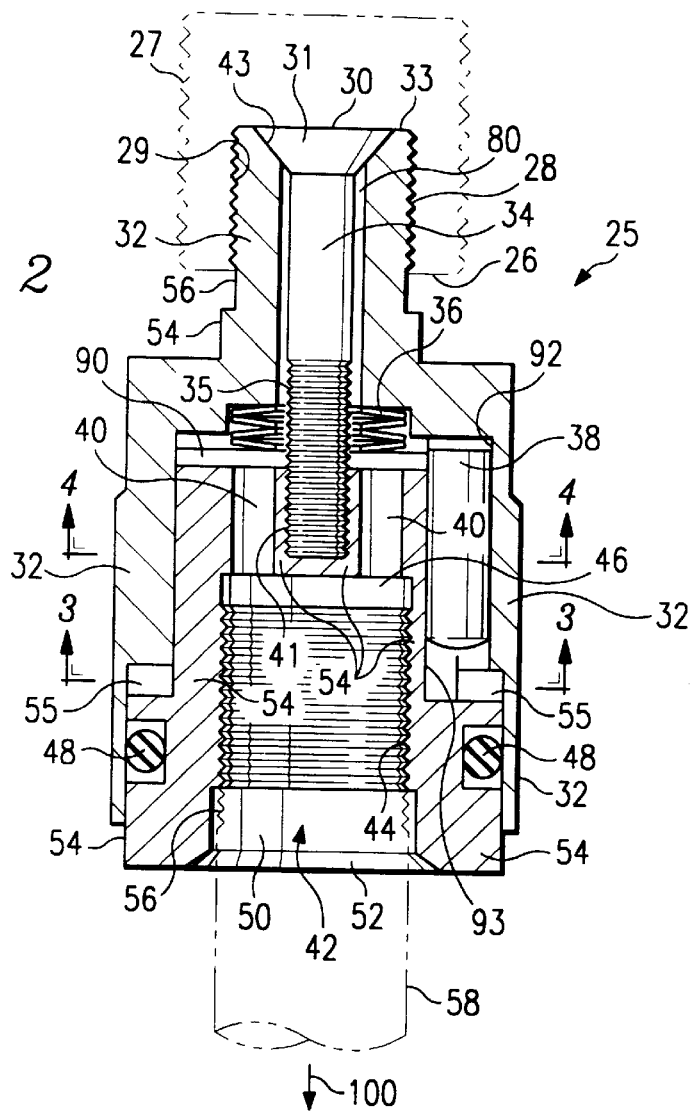
FIG. 2 is a sectional drawing showing a side view with portions broken away of the automatic shut-off valve illustrated in FIG. 1 in a closed position.

FIG. 2 is a drawing showing a side view with portions broken away of the automatic shut-off valve 25 illustrated in FIG. 1 in a closed position. Drive member 32 of automatic shut-off value 25 includes a drive end 33. Drive end 33 of drive member 32 may be inserted within and coupled to drive end 26 of spindle 18. External threads 28 on drive member 32 may couple with internal threads 29 on drive end 26 of spindle 18. Within drive member 32, a fluid blocking member 30 is disposed. In the embodiment illustrated in FIG. 2, fluid blocking member 30 is a flathead screw; however, other suitable fluid blocking members may be used. Fluid blocking member 30 functions to selectively allow or prevent fluid, such as lubricant or coolant, to flow through aperture 43 of automatic shut-off valve 25 from spindle 18 to cutter 58. Aperture 43 is shown best in FIG. 5.

The fluid blocking member 30 illustrated in FIG. 2 includes a head portion 31 and a stem portion 34. Stem portion 34 of fluid blocking member 30 is secured within a portion of driven member 54. Stem portion 34 includes external threads 35. External threads 35 may be mated with internal threads 41 on driven member 54. Drive member 32 and driven member 54 may be press fit together; however, as discussed in greater detail below, drive member 32 and driven member 54 may move axially relative to each other to selectively provide a fluid passageway for a coolant or lubricant to flow through automatic shut-off valve 25. Also discussed in greater detail below, axial movement between drive member 32 and driven member 54 effects relative axial movement between fluid blocking member 30 and drive member 32.

Separating drive member 32 and driven member 54 are a plurality of elastic members 36. In the embodiment illustrated in FIG. 2, elastic members 36 are disc springs; however, other suitable elastic members that allow relative motion between drive member 32 and driven member 54 may be used. As discussed in greater detail below, elastic members 36 are selectively compressed to provide a passage for fluid flow of lubricant or coolant from spindle 18 through automatic shut-off valve 25 to cutter 58. In one embodiment, elastic members 36 may surround stem portion 34, as illustrated in FIG. 2. Driven member 54 also includes fluid passages 40 and channel 90 extending from a first fluid passage 40 to a second fluid passage 40. Fluid passages 40 are also shown in FIGS. 3 and 4.

A plurality of torque transfer members 38 are arranged circumferentially partially within drive recesses 92 in drive member 32 and partially within driven recesses 93 in driven member 54 to transfer torque from drive member 32 to driven member 34. Drive member recesses 92 and driven member recesses 93 are shown best in FIG. 4. In the embodiment illustrated in FIGS. 2 through 5, torque transfer members 38 are pins; however, other suitable torque transfer members may be utilized that transfer torque from a drive member, such as drive member 32, to a driven member, such as driven member 54. For example, balls similar to ball bearings and keys conventionally used for mating with a keyway may be used. Three pins are illustrated in FIGS. 2 through 5; however, any suitable number of pins may be used.

Within driven member 54 is a cavity 42 for receiving cutter 58. On the inner walls of cavity 42, internal threads 44 are formed for mating with external threads 56 on cutter 58. O-rings 48 are formed on driven member 54 to provide a seal between driven member 54 and drive member 32. A seal between driven member 54 and drive member 32 prevents the unwanted discharge of fluid, such as lubricant or coolant, to the surrounding atmosphere. An annular gap 55 separates drive member 32 and driven member 54 when automatic shut-off valve 25 is closed. Automatic shut-off valve 25 also includes a locating counter bore 50 and locating banking shoulder 52 formed on driven member 54 for facilitating coupling of cutter 58 with cavity 42 of driven member 54.

Figure 3:
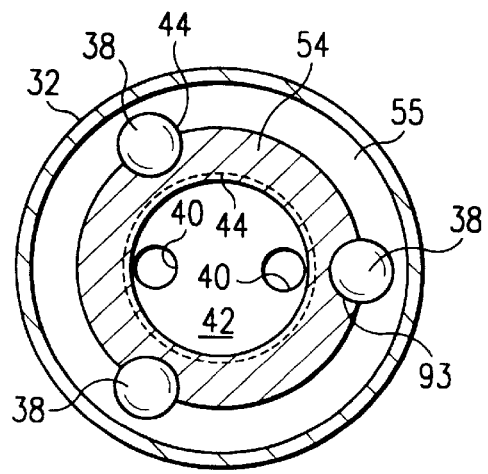
FIG. 3 is a sectional drawing taken along lines 3—3 of FIG. 2 further illustrating the interior of the automatic shut-off valve illustrated in FIGS. 1 and 2.
Figure 4:
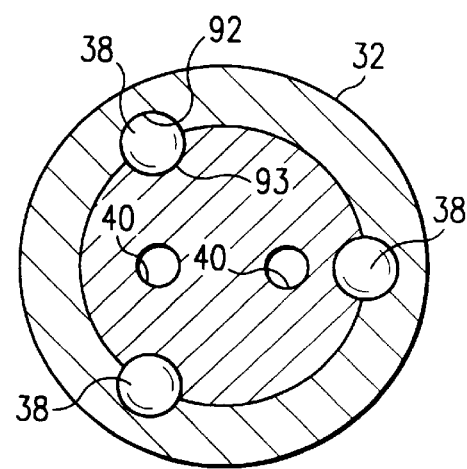
FIG. 4 is a sectional drawing taken along lines 4—4 of FIG. 2 further illustrating the interior of the automatic shut-off valve illustrated in FIGS. 1 and 2.

FIG. 3 is a sectional drawing in section taken along lines 3—3 of FIG. 2 further illustrating the interior of the automatic shut-off valve 25 illustrated in FIGS. 1 and 2. Drive member 32 and the driven member 54 are shown in FIG. 3 as separated by gap 55. Drive member recess 92, shown in FIG. 2, is not seen in this view. Torque transfer members 38 resting in drive member recesses 93 and also resting in drive member recesses 92 (shown best in FIG. 4) couple drive member 32 and driven member 54 to transfer torque from drive member 32 to driven member 54.

FIG. 4 is a sectional drawing in section taken along lines 4—4 of FIG. 2 further illustrating the interior of the automatic shut-off valve 25 illustrated in FIGS. 1 and 2. FIG. 4 further illustrates torque transfer members 38 disposed within drive member recesses 92 and driven member recesses 93.

Figure 5:
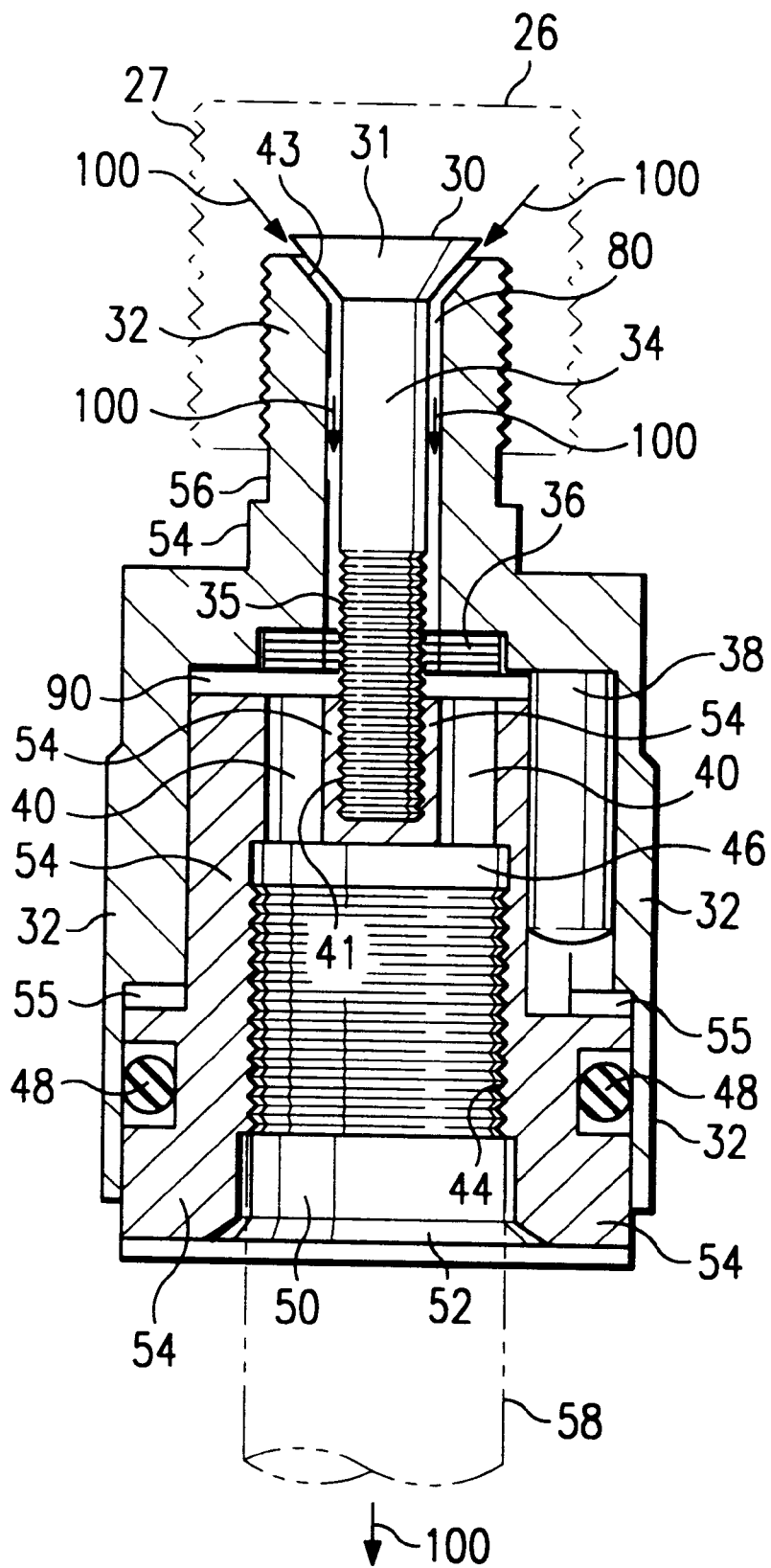
FIG. 5 is a sectional drawing showing a side view with portions broken away of the automatic shut-off valve illustrated in FIG. 1 in an open position.

FIG. 5 is a sectional drawing showing a side view with portions broken away of the automatic shut-off valve 25 illustrated in FIG. 1 in an open position. When automatic shut-off valve 25 is open, elastic members 36 are compressed and drive member 32 has moved relative to driven member 54, reducing gap 55. This relative movement between drive member 32 and driven member 54 creates a passage for fluid 100 to flow past fluid blocking member 30 through aperture 43, fluid passages 40, and cavity 42 to provide lubricant to cutter 58. Because fluid blocking member 30 is displaced from aperture 43, fluid 100 is allowed to flow through aperture 43 and therefore automatic shut-off valve 25. Fluid 100 may include any suitable lubricant or coolant that is desired.

With reference to FIGS. 1 through 5, the operation of automatic shut-off valve 25 and the combination of positive feed drill 10, automatic shut-off valve 25 and cutter 58 is described. To drill through a substrate (not explicitly shown) air motor 11 is actuated, which rotates drill spindle 13. Rotation of drill spindle 13 turns rotation gears 12 and differential feed gear 15. Rotation of differential feed gear 15 and rotation gears 12 causes rotation of spindle feed gear 16 and spindle drive gear 14. As discussed above, the relative speeds of spindle feed gear 16 and spindle drive gear 14 determine whether spindle 18 will advance downward towards the substrate that is drilled or upwards away from the substrate being drilled.

Lubricant is received within spindle 18 through hose 94 from a fluid reservoir (not explicitly shown). The fluid 100 travels within the interior of spindle 18 until it encounters automatic shut-off valve 25. If automatic shut-off valve 25 is closed, as illustrated in FIG. 2, fluid 100 will not be allowed to flow to cutter 58.

With the spindle 18 advancing downwardly toward the substrate, cutting portion 70 will contact the substrate, relaying a thrust force through cutter 58 to driven member 54. Driven member 54 in turn relays this thrust force to elastic members 36. When elastic members 36 receive this thrust force, elastic members 36 are compressed. Compression of elastic members 36 allows relative motion of drive member 32 with respect to driven member 54, resulting in the configuration shown in FIG. 5. Drive member 32 and driven member 54 will retain this orientation as long as thrust is applied to cutting portion 70. In the orientation illustrated in FIG. 5, fluid 100, received from hose 94 through spindle 18, is allowed to flow through aperture 43 and therefore through drive member 32 past fluid blocking member 30. When cutting portion 70 of cutter 58 penetrates a substrate, the thrust force is removed. Removal of the thrust force allows elastic members 36 to expand, returning the relative orientation of drive member 32 and driven member 54 to that illustrated in FIG. 2. In this closed orientation, fluid 100 is prevented from flowing past fluid blocking member 30 through aperture 43 and through drive member 32 to provide lubricant or coolant to cutter 58.

Although the present invention has been described in detail, various changes and modifications may be suggested to one skilled in the art, and it should be understood that various changes, substitutions, and alterations can be made without departing from the scope and the spirit of the invention as defined by the following claims.

What is claimed is:

1. An automatic fluid feed system for use with a rotating drill bit for substrates wherein the system comprises:
   (a) a drive member which is rotated by a motor connected through a drive system to the drive member wherein the drive member incorporates a fluid flow passage therethrough communicated with a fluid flow source and said passage ends at a fluid flow aperture;
   (b) a driven member cooperatively rotated by said drive member to rotate a drill bit supported thereby;
   (c) a releasable torque transfer member between said drive member and said driven member to enable said drive member to rotate said driven member wherein said torque transfer member is responsive to loading on said drill bit; and (d) a valve element cooperatively arranged with said fluid flow passage to enable fluid flow from said passage for lubricating said drill bit so that said valve element releases fluid to flow for said drill bit when loading acting on said drill bit is in a specified range.

2. The apparatus of claim 1 wherein said valve element is supported by said driven member and rotates therewith.

3. The apparatus of claim 1 wherein said valve element is opened when said torque transfer member engages said driven member to said drive member for rotation thereby.

4. The apparatus of claim 1 where said torque transfer member is primarily responsive to loading on said rotating drill bit.

5. The apparatus of claim 1 wherein said torque transfer member comprises concentric rotating members forced to rotate together at synchronized speeds by movement of a lock member coactive between said concentric members and said coactive member is mounted for movement between engaging and disengaging positions.

6. The apparatus of claim 4 wherein said drive member comprises an elongate shaft terminating at a distal end and said shaft incorporates at said distal end a sealed connection to a liquid fluid flow feed line.

7. The apparatus of claim 6 wherein said drive member and said passage therein are sealed so that fluid flow is contained therein, and said aperture is selectively closed by relative movement into and out of engagement by a movable head within said aperture.

8. A control valve for installation between a fluid flow line delivering the flow of lubricant and a rotating drill bit for drilling through sheet material, the valve cooperating with and comprising:

(a) an elongate, hollow, cylindrical, rotationally mounted drive member having a first end and a second end with a passage therethrough and said passage extends between said ends and terminates at an aperture at the second end;

(b) a driven member concentric positioned at the second end of said drive member wherein said driven member supports a drill bit;

(c) a power drive system connected between a motor and said driven member to impart rotation to said driven member through said drive member wherein said drive member and driven member are axially aligned and rotate about a common axis; and (d) a valve element cooperative with a valve seat wherein said valve element and seat are mounted at said passage aperture and said valve element and seat control fluid flow through said drive member responsive to said rotating drill bit to thereby control fluid flow therethrough.

9. The control valve of claim 8 including a position responsive support for said valve element and valve seat so that said valve element is seated against said valve seat in a closed position and is moved from said valve seat in an open position, and said control valve further comprises a controllable torque transfer connection between said drive member and said driven member moving said valve element between said opened and closed positions.

10. The control valve of claim 8 comprising a stem extending from said valve element and axially aligned with said valve seat so that movement of said valve element is guided by said stem, and further incorporating a resilient bias member tending to close said valve element against said valve seat.

11. The apparatus of claim 10 wherein said bias member comprises a spring subject to compression on opening of said valve element from said valve seat.

12. The control valve of claim 8 wherein said valve element is moved to an open position to deliver fluid flow therethrough when said drill bit reactively encounters work piece cut thereby and forms a force along said drill bit to open said valve element from said valve seat.

13. The apparatus of claim 8 wherein said valve element is supported by said driven member and rotates therewith, and said cooperative valve seat is positioned about said valve element.

14. The apparatus of claim 8 wherein said valve element comprises a sloping head on a threaded member and said head seats snugly in and against said valve seat, and wherein said valve element and seat move relatively axially with respect to said drive member to open a fluid flow path beyond said valve element and valve seat extending to said drill bit rotated by said driven member.

15. A method of drilling through a substrate wherein the method comprises the steps of:

(a) mounting a drill bit on a driven member;

(b) connecting a drive member to the driven member;

(c) applying rotation controllably from a motor to said drive member so that said drive member imparts rotation to said driven member and the drill bit;

(d) while rotating the drill bit, advancing the drill bit axially into the substrate to be drilled at a controlled rate to thereby load the rotating drill bit into a specified range of loading; and (e) in responsive to loading in the specified range, controllably opening a fluid flow valve to deliver a flow of lubricant to the rotating drill bit while operating in the range, and switching off the flow when operating outside the selected range.

16. The method of claim 15 wherein said step of mounting a drill bit includes the step of positioning said drill bit axially aligned with a rotating spindle wherein said rotating spindle is moved with said drill bit, and further including the added steps of:

(a) advancing the drill bit towards the substrate to be drilled thereby;

(b) drilling with the drill bit while forming a load on said drill bit transferred to said driven member;

(c) in response to load thereon, changing the relative position of said driven member and drive member; and (d) controlling the flow at said valve so that lubricant is delivered to the rotating drill bit in response to loading on the drill bit in a specified range.

17. The method of claim 15 including the step of forming a fluid flow passage through said drive member terminating at one end of said drive member, and delivering a fluid flow therethrough for said fluid flow valve.

18. The method of claim 15 including the step of delivering a fluid flow through said fluid flow valve and controlling said fluid flow through a torque responsive switch dependent on torque applied to said drill bit.

19. The method of claim 15 inlcuding the step of controlling the torque transfer between said drive membe and said driven member, and in response to the torque transfer, controllably switching fluid flow to said fluid flow valve.

* * * * *